United States Patent [19]
Hölzle et al.

[11] Patent Number: 5,933,635
[45] Date of Patent: Aug. 3, 1999

[54] METHOD AND APPARATUS FOR DYNAMICALLY DEOPTIMIZING COMPILED ACTIVATIONS

[75] Inventors: Urs Hölzle, Goleta; Lars Bak, Palo Alto, both of Calif.

[73] Assignee: Sun Microsystems, Inc., Palo Alto, Calif.

[21] Appl. No.: 08/944,330

[22] Filed: Oct. 6, 1997

[51] Int. Cl.⁶ ........................ G06F 9/445
[52] U.S. Cl. ........................ 395/701
[58] Field of Search ............... 395/705, 709, 395/701

[56] References Cited

PUBLICATIONS

Hölzle et al., "Debugging Optimized Code with Dynamic Deoptimization", Jun. 1992, ACM SIGPLAN '92 Conference on Programming Language Design and Implementation, San Francisco.
A Third–Generation SELF Implementation: Reconciling Responsiveness with Performance by Holzle et al in ACM 0–89791–688–3/94/0010, Oct. 1994.
Optimizing Dynamically–Dispatched Call with Run–Time Type Feedback by Holzle et al in ACM, 1994.
Reconciling Responsiveness with Performance in Pure Object–Oreinted Languages by Holzle et al in ACM, 1996.

*Primary Examiner*—Tariq R. Hafiz
*Assistant Examiner*—Chameli C. Das
*Attorney, Agent, or Firm*—Beyer & Weaver, LLP

[57] ABSTRACT

Methods and apparatus for dynamically deoptimizing a frame in a control stack during the execution of a computer program are disclosed. The described methods are particularly suitable for use in computer systems that are arranged to execute both interpreted and compiled byte codes. According to one aspect of the present invention, a computer-implemented method for deoptimizing a compiled method includes creating a data structure. The data structure, which is separate from the control stack, is arranged to store information relating to the compiled method. A reference indicator, such as a pointer, is created to associate the data structure with the frame. The method, which is compiled to a first state of optimization, is then deoptimized to a second state of optimization, and the method in the first state of optimization may be discarded, thereby deoptimizing the frame. When control returns to the deoptimized frame, a migration routine creates at least one new stack frame, and execution may continue using the method in the second state of optimization.

25 Claims, 8 Drawing Sheets

Figure 8

METHOD AND APPARATUS FOR DYNAMICALLY DEOPTIMIZING COMPILED ACTIVATIONS

CROSS REFERENCE TO RELATED APPLICATIONS

This application is related to U.S. patent application Ser. No. 08/944,332 (Atty. Docket No. SUN1P146/P2296), entitled "Inline Database for Receiver Types in Object-Oriented Systems," U.S. patent application Ser. No. 08/944, 735 (Atty Docket No. SUN1P147/P2297), entitled "Method and Apparatus for Performing Byte-Code Optimization During Pauses, U.S. patent application Ser. No. 08/944,335 (Atty. Docket No. SUN1P150/P2300), entitled "Mixed Execution Stack and Exception Handling," U.S. patent application Ser. No. 08/944,326 (Atty: Docket No. SUN1P152/P2302), entitled "Method and Apparatus for Implementing Multiple Return Sites," U.S. patent application Ser. No. 08/944,331 (Atty. Docket No. SUN1P156/P2306), entitled "Site Specific Message Dispatch in Object-Oriented Systems," U.S. patent application Ser. No. 08/944, 334(Atty. Docket No. SUN1P168/P2840), entitled "Method and Apparatus for Dynamically Optimizing Byte-Coded Programs," all filed concurrently herewith, U.S. patent application Ser. No. 08/884,856 (Atty. Docket No. SUN1P144/P2260), entitled "Interpreting Functions Utilizing a Hybrid of Virtual and Native Machine Instructions," filed Jun. 30, 1997, and U.S. patent application Ser. No. 08/885,008 (Atty. Docket No. SUN1P151/P2301), entitled "Interpreter Generation and Implementation Utilizing Interpreter States and Register Caching," filed Jun. 30, 1997, which are all incorporated herein by reference for all purposes in their entirety.

BACKGROUND OF THE INVENTION

1. Field of Invention

The present invention relates generally to methods and apparatus for deoptimizing compiled activations in software applications. More particularly, the present invention relates to methods and apparatus for performing eager deoptimization of compiled activations during the overall execution of a computer program.

2. Description of Relevant Art

Computer systems are often linked across a network, e.g., local area networks, intranets and internets, of computer systems such that they may share resources. Share resources often include software applications. In general, software applications, or computer programs, may be delivered in different formats to different computer systems, due to the fact that each computer system requires software applications to be in a specific format. Alternatively, the computer programs may be delivered to a computer system in a machine-independent form, i.e., as byte codes, in order to enable one form of a computer program to be utilized by many different computer systems.

When computer programs are delivered in a machine-independent form, the programs may be interpreted directly, or the programs may be translated into machine-dependent code, i.e., "machine code." Programs which are interpreted directly occupy less space in a computer system than programs which are translated into machine code. However, programs which are interpreted directly have slower execution speeds than programs which are translated into machine code, in most cases. As such, the determination of whether or not to interpret a computer program directly, in lieu of translating the computer program into machine code, is often based on the relative importance of space in relation to execution speed.

Some computer systems may be arranged to support both interpreted code and compiled, or machine, code. During the course of executing a program on a system which supports both interpreted and compiled code, it may sometimes be beneficial to eliminate, or delete, a compiled method. Eliminating a compiled method, which contains compiled activations, generally frees space within the computer system. Hence, when additional space is needed on a computer system, a compiled method may be deleted, and replaced with an interpreter code equivalent, because an interpreted method occupies less space than its compiled code equivalent.

In addition, compiled code may have to be discarded because the code was based on assumptions that are no longer valid. By way of example, compiled code may be discarded because a new class was loaded, or because program code was changed. When the assumptions are no longer valid, i.e., no longer hold, if the computer system continues to execute the compiled code, erroneous results may occur. Hence, the computer system must generally cease execution of the compiled code to guard against erroneous results, even in the event that the compiled code is currently executing in one or more activation records.

Each method in a computer program, or application, is typically associated with at least one frame on a computer control stack. As such, when a compiled method is deleted, any frames, i.e., compiled frames, associated with the compiled method must essentially be transformed into interpreter frames. In general, compiled frames may also be transformed into interpreter frames when compiled frames are invalidated, as described above. Transforming such invalid compiled frames into interpreter frames essentially converts invalid frames into valid frames, as will be appreciated by those skilled in the art.

A frame is an activation record that is stored on the control stack, as is well known in the art. The frame pertains to a method, and is arranged to store information for the execution of the method. Information stored in a frame may include control state variables, local variables and an expression stack. A control stack is a stack that is utilized during program execution to store frames for methods, or functions, in their sequential calling order. When a method is called, a frame for the method is pushed onto the control stack. Subsequently, when the method terminates, the frame associated with the method is popped off the stack and the function for the new frame on the top of the control stack resumes execution, i.e., regains control.

A compiled frame may not be transformed into an interpreter code equivalent until the compiled frame is at the top of the control stack, due to the fact that the interpreter code equivalent often requires more space on the control stack than required by the compiled frame. Hence, a method may not be decompiled or deoptimized until the frame which corresponds to the method is at the top of the control stack, since additional space may not be allocated in the middle of the control stack. As such, when the compiled frame is located in the middle of the control stack, e.g., the compiled frame is not the topmost frame in the control stack, the compiled frame may not be replaced by corresponding interpreter frames.

Figure 1:
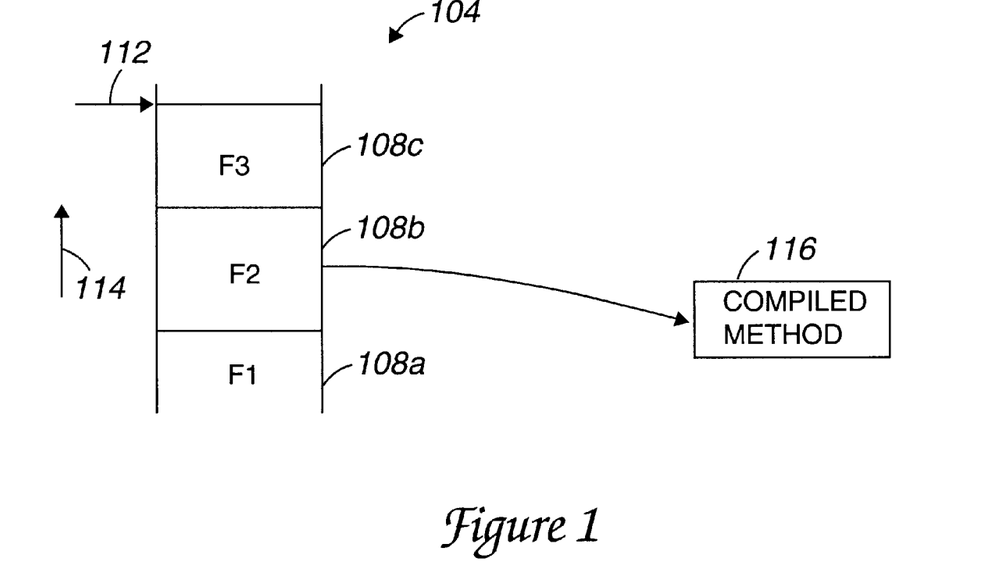
FIG. 1 is a diagrammatic representation of a control stack which includes compiled frames.

FIG. 1 is a diagrammatic representation of a control stack which includes compiled frames. A control stack 104 includes frames 108 which, as described above, are associated with methods. By way of example, frame 108b is a record which contains activation information associated with a compiled method 116. A stack pointer 112 identifies the location of the topmost frame 108 in stack 104, i.e., frame 108c, which is the frame which is currently executing. Arrow 114 indicates the direction in which stack 104 grows. Therefore, as indicated by arrow 114, frame 108c is the topmost frame in stack 104 and, hence, is the frame with control.

Compiled method 116, and frame 108b, contain information which may be used to create an interpreter code equivalent of compiled method 116. The interpreter code equivalent of compiled method 116 may generally be accessed and, hence, obtained at any time. However, interpreter frames associated with the interpreter code equivalent may occupy a different amount of space on stack 104 than frame 108b. Since frames which contain the interpreter code equivalent of compiled method 116, i.e., interpreter frames, may occupy more space on stack 104 than frame 108b, the interpreter frames may not be inserted into stack 104 until frame 108b is popped to the top of stack 104, as mentioned above. In other words, frame 108b must essentially be the frame with control in stack 104 before method 116 and frame 108b may be deoptimized.

As described above, frame 108b may not be deoptimized when frame 108b is in the middle of stack 104. Accordingly, when it is determined that compiled method 116 is to be deleted, the deletion of compiled method 116 and, hence, the deoptimization of frame 108b must be delayed. Therefore, compiled method 116 may be marked for deletion, and frame 108b may be marked for deoptimization, such that when frame 108b is the topmost frame within stack 104, compiled method 116 is deleted, while frame 108b is deoptimized.

Figure 2:
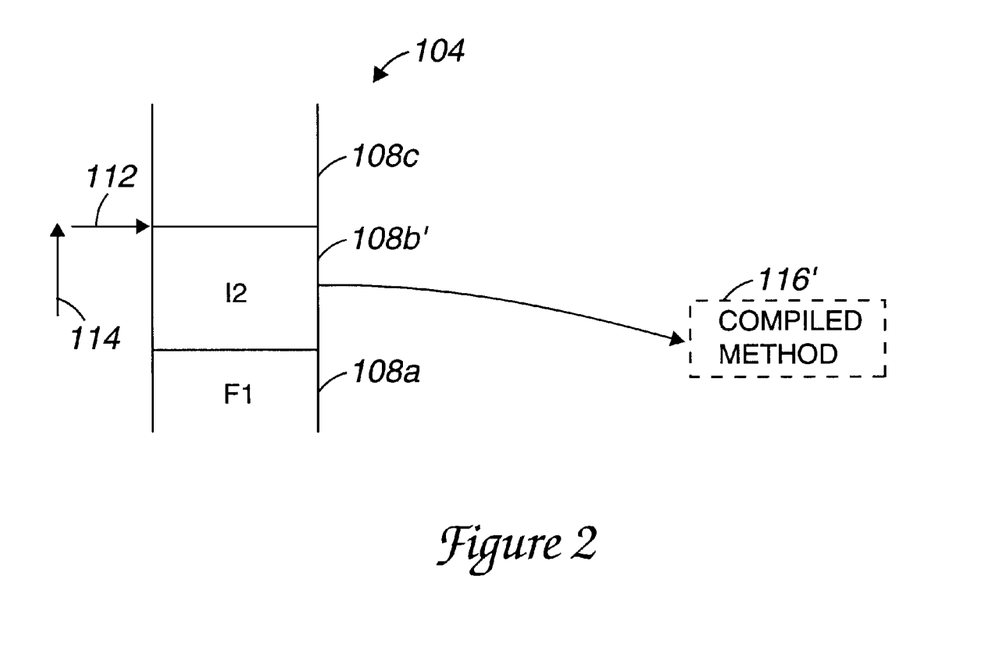
FIG. 2 is a diagrammatic representation of control stack 104 of FIG. 1 after an interpreter frame has replaced a compiled frame.

With reference to FIG. 2, the deoptimization of frame 108b in stack 104 of FIG. 1 will be described. When frame 108c, as shown in FIG. 1, is popped from stack 104, then frame 108b is no longer in a middle position within stack 104. In other words, frame 108b becomes the topmost frame in stack 104. Frame 108b may then be replaced by interpreter frame 108b', which includes an interpreter activation of compiled method 116. Stack pointer 112 may then be set to point to interpreter frame 108b'. Once interpreter frame 108b' is pushed onto stack 104, compiled method 116 may be deleted, as indicated by deleted compiled method 116'. Space which was previously occupied by compiled method 116 is then available to be reallocated for other uses.

Frame 108b may also be deoptimized just before frame 108b becomes the topmost frame in stack 104. In other words, frame 108b may be deoptimized just as frame 108c is about to return and be popped from stack 104. The deoptimization of frame 108b just before frame 108b becomes the topmost frame is known as "lazy" deoptimization. Lazy deoptimization is described in "Debugging Optimized Code with Dynamic Deoptimization," by Urs H ölzle, Craig Chambers, and David Ungar (ACM SIGPLAN '92 Conference on Programming Language Design and Implementation, San Francisco, June 1992), which is incorporated herein by reference in its entirety. In lazy deoptimization, deoptimization of a particular compiled frame is delayed until the only frame which is higher in a stack than the particular compiled frame is about to return to the particular compiled frame. As such, in lazy deoptimization, the deoptimization of a frame occurs just as that frame is about to resume execution.

In general, at least some of the computer resources, e.g., memory space, allocated to a compiled method may be slated for reallocation when insufficient resources are available for other purposes. When resources allocated to the compiled method are to be reallocated or redistributed, the compiled method must be deleted, or otherwise deoptimized, in order to free the resources. Therefore, deferring the deletion of the compiled method is often undesirable, since resources which may be used immediately for other purposes will not available until the compiled method is deleted. That is, since the length of delays prior to deletion are often relatively long, depending on factors such as the stack location of a frame that is to be deoptimized, the process of decompiling a compiled method and deoptimizing an associated compiled frame may be inefficient. As such, mechanisms that essentially eliminate the delays associated with decompilation and deoptimization are desired. That is, methods and apparatus which improve the efficiency of dynamic decompilation of compiled methods and dynamic deoptimization of compiled frames associated with a computer program would be desirable.

SUMMARY OF THE INVENTION

To achieve the foregoing and other objects of the invention, methods and apparatus for dynamically deoptimizing a frame in a control stack during the execution of a computer program are disclosed. The described methods are particularly suitable for use in computer systems that are arranged to execute both interpreted and compiled byte codes. According to one aspect of the present invention, a computer-implemented method for deoptimizing a compiled method includes creating a data structure. The data structure, which is separate from the control stack, is arranged to store information relating to the compiled method and the frame on that control stack that is to be deoptimized. A reference indicator, such as a pointer, is created to associate the data structure with the frame. The compiled method may then be discarded immediately.

In one embodiment, the data structure is machine-independent, and the decompilation of the compiled method includes deleting the compiled method. In such an embodiment, the new state of the activation of the control stack is an interpreted state. When the data structure is machine-independent, the data structure may be used by a variety of different computers, such that a control stack may be moved from one machine to another machine of the same or different architecture.

According to another aspect of the present invention, a method for dynamically deoptimizing a first frame, which is associated with a compiled method which includes a compiled activation, on a control stack includes decompiling the compiled method. The compiled method may be decompiled when the first frame is located beneath a second frame on the control stack. Decompiling the compiled method includes decompiling the compiled activation to create an interpreter equivalent of the compiled activation. The second frame is eventually popped from the control stack, and an interpreter frame is created from the interpreter equivalent of the compiled activation. The interpreter frame is then pushed onto the stack in place of the first frame. In one embodiment, the interpreter equivalent of the compiled activation is stored in a temporary data structure that is associated with the first frame. In such an embodiment, the data structure may be deleted after the interpreter frame is created.

According to still another aspect of the present invention, a method for dynamically deoptimizing a compiled method associated with a first frame selected from a plurality of frames on a control stack includes creating a data structure that is referenced by the first frame. The data structure, which is separate from the control stack, contains interpreter information relating to the first frame and method information relating to the compiled method. The compiled method is deleted, and the interpreter information is unpacked when the stack pointer associated with the control stack identifies the first frame as the current frame. Unpacking the interpreter information involves the creation of an interpreter frame. The interpreter frame is pushed onto the control stack to replace the first frame.

In one embodiment, the method includes using access information describing the location of local variables and expression state, and placing the interpreter information into the data structure. The interpreter information is accessed using the access information. In such an embodiment, placing the interpreter information into the data structure includes extracting method information from the compiled method, extracting interpreter information from the first frame, and creating at least one interpreted activation using the interpreter information and the method information. In such an embodiment, the interpreter information is migrated into the data structure.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

During the execution of a computer program which is running in a computer system that supports both interpreted code and compiled code, the deletion of compiled methods is typically desirable when resources within the computer system are to be more efficiently allocated, as described above. Generally, the deoptimization of a compiled method and, further, the deoptimization of an associated compiled frame on a control stack, are delayed until the associated compiled frame is either the topmost frame on the stack or about to become the topmost frame on the stack. Since the deoptimization of a compiled frame may involve the generation of interpreter frames which occupy more space on the stack than the compiled frame occupied, the compiled frame is not deoptimized while it is located somewhere in the middle of the stack due to space constraints. The delay in the deletion of the compiled method delays the availability of resources within the computer system.

Allowing the deoptimization of a compiled method and an associated compiled frame to occur regardless of the stack location of the compiled frame allows the compiled method to be discarded essentially without delay. In order to allow the deoptimization of a compiled method and a corresponding compiled frame to occur without being deferred until control is either returned to or about to be returned to the compiled frame, a structure may be created to temporarily hold interpreter information associated with the compiled method. Such a deoptimization may be considered to be an "eager" deoptimization, as it does not require that deoptimization be deferred until a frame which is to be deoptimized either has, or is about to gain, control.

By creating a data structure to hold interpreter information off of the stack, a compiled frame, which is to be replaced by frames created from the interpreter information, and a corresponding method may be deoptimized while the compiled frame is in the middle of a stack. In other words, the compiled method associated with the compiled frame may be deleted, or otherwise deoptimized, without deferring the deletion until the compiled frame reaches the top of the stack. Since interpreter frames created from the interpreter information may occupy more space on the stack than the deoptimized frame originally occupied, the use of a data structure enables deoptimization to occur eagerly without encountering issues involving the sizing of interpreter frames in the middle of the stack. That is, the data structure temporarily holds information which is intended to be unpacked to create interpreter frames when the deoptimized frame eventually reaches the top of the stack.

Figure 3A:
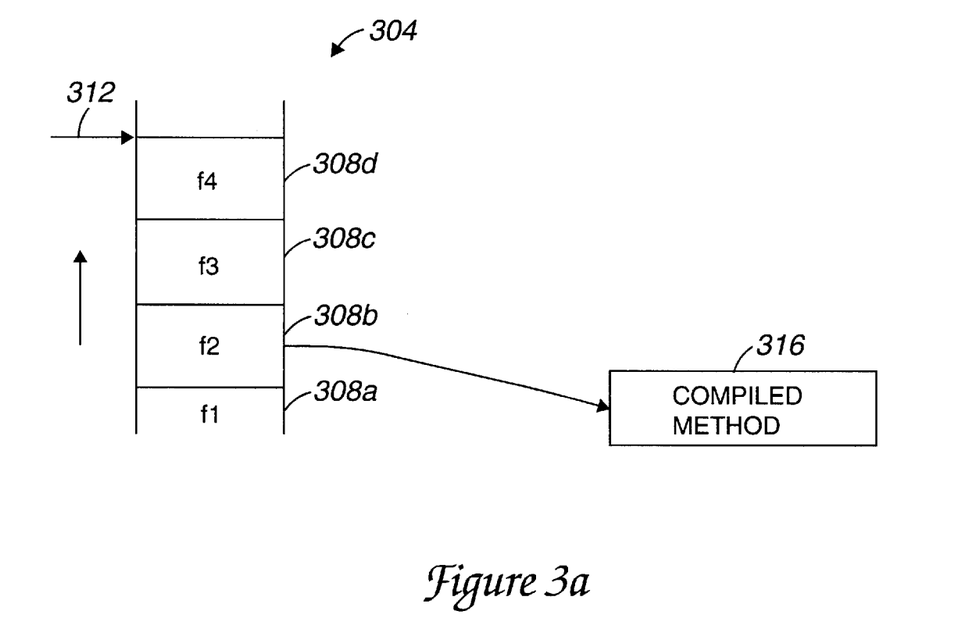
FIG. 3a is a diagrammatic representation of a control stack which includes compiled frames in accordance with an embodiment of the present invention.

FIG. 3a is a diagrammatic representation of a control stack which includes a frame that is associated with a compiled method in accordance with an embodiment of the present invention. A stack 304 includes a plurality of optimized, or compiled, frames 308. A stack pointer 312 identifies a current frame, e.g., frame "f4" 308d, in stack 304. Current frame 308d is the frame which has control within an overall computer system that includes stack 304. That is, current frame 308d is the topmost frame within stack 304. In the described embodiment, a frame "f2" 308b, referred to herein and below as frame 308b, is associated with a compiled method 316. Specifically, frame 308b includes state information pertaining to compiled activations included in compiled method 316.

In general, compiled method 316, which is compiled to a given level of optimization, may be deoptimized such that compiled method 316 is at a lower level of optimization. In one embodiment, when compiled method 316 is to be deleted, then the compiled activations in compiled method 316 may be replaced by byte code equivalents, e.g., interpreter activations. That is, frame 308b, which is optimized, may be replaced by an interpreted frame, or frames.

Compiled method 316 may be deoptimized for a variety of different reasons. The different reasons include, but are not limited to, the invalidation of compiled method 316 due to changes in program code, and the need for additional computer memory space. By deoptimizing compiled method 316 or, more specifically, frame 308b, frame 308b may be made valid when compiled method 316 is invalid. Further, as compiled code generally occupies more computer memory space than interpreted code, deoptimizing compiled method 316 typically releases computer memory space.

Figure 3B:
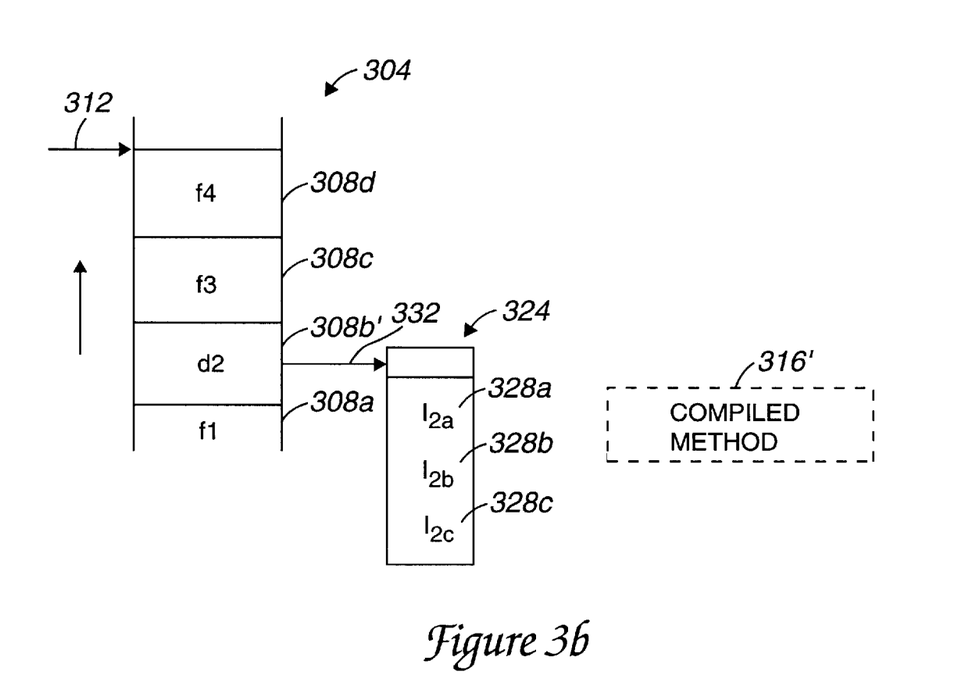
FIG. 3b is a diagrammatic representation of control stack 304 of FIG. 3a after a compiled frame has been deoptimized and a virtual frame array has been created in accordance with an embodiment of the present invention.

Information relating to an interpreted representation of compiled method 316 may be contained within both compiled method 316 and frame 308b. In general, compiled method 316 contains static information while frame 308b contains dynamic information, as will be appreciated by those skilled in the art. The information is used, as will be described below with reference to FIG. 4, in the creation of a data structure that is essentially arranged to hold interpreter activations. The creation of the data structure that holds interpreter activations allows frame 308b to be deoptimized. FIG. 3b is a diagrammatic representation of stack 304 after a data structure that holds interpreter activations is created in accordance with an embodiment of the present invention. A data structure 324, which is called a virtual frame ("vframe") array, holds interpreter activations 328 that represent compiled method 316 of FIG. 3a.

As shown, compiled method 316 is represented by three interpreter activations 328. It should be appreciated, however, that the number of interpreter activations 328 that represent compiled method 316 may generally vary widely depending upon a variety of different factors. Such factors may include, but are not limited to, the size of compiled method 316, i.e., the number of compiled activations associated with compiled method 316, and optimizations, such as inlining, performed by the compiler.

A pointer 332 from deoptimized frame 308b' identifies vframe array 324. In other words, pointer 332 is arranged to indicate that vframe array 324 is associated with deoptimized frame 308b'. In general, vframe array 324 is associated with only a single deoptimized frame, such as deoptimized frame 308b'. However, in some embodiments, a plurality of deoptimized frames, both adjacent and non-adjacent, may share a single vframe array.

The creation of vframe array 324 may generally occur at any time. In particular, vframe array 324 may be created while deoptimized frame 308b' is in the middle of stack 304. Once vframe array 324 is created, compiled method 316 is deleted, as indicated by deleted compiled method 316'. The deletion of compiled method 316 allows system resources, e.g., memory space, associated with compiled method 316 to be reallocated. Specifically, compiled method 316 may be deleted before deoptimized frame 308b' is at the top of stack 304, i.e., substantially at anytime before deoptimized frame 308b' becomes the current frame. Therefore, system resources associated with compiled method 316 may be reallocated, and frame 308b of FIG. 3a may become deoptimized frame 308b', whenever necessary.

Figure 3C:
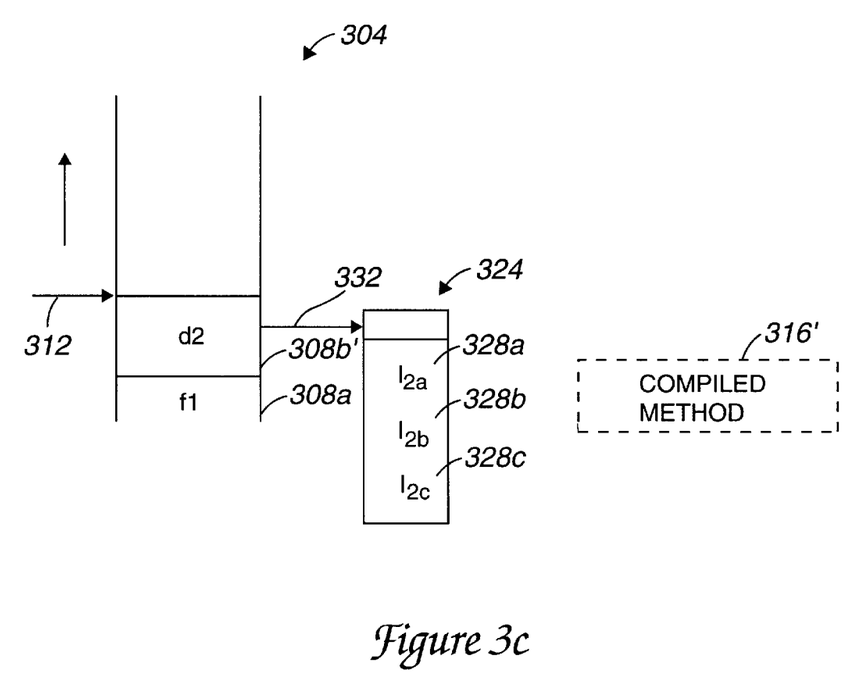
FIG. 3c is a diagrammatic representation of control stack 304 of FIG. 3b after deoptimized frame 308b' becomes the topmost frame in accordance with an embodiment of the present invention.
Figure 3D:
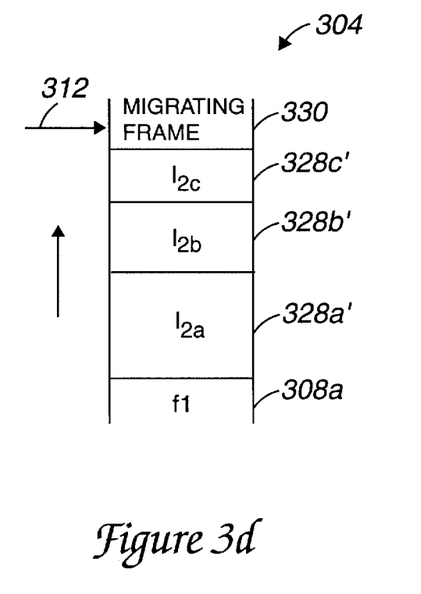
FIG. 3d is a diagrammatic representation of control stack 304 of FIG. 3c after interpreter frames replace the deoptimized frame in accordance with an embodiment of the present invention.

When stack pointer 312 indicates that deoptimized frame 308b' is the current frame on stack 304, as shown in FIG. 3c, then vframe array 324 is unpacked to create corresponding interpreter frames on stack 304, as shown in FIG. 3d. Interpreter activation 328a is unpacked and essentially transformed into interpreter frame 328a', which is placed on stack 304. Similarly, interpreter activation 328b corresponds to interpreter frame 328b', and interpreter activation 328c corresponds to interpreter frame 328c'. Once interpreter frames 328' are pushed onto stack 304, stack pointer 312 is set to identify interpreter frame 328c' as the current frame. In one embodiment, a system may additionally create a migrating frame 330 that is used to properly link all interpreter frames 328. The steps associated with unpacking vframe array 324 and, hence, creating interpreter frames 328' on stack 304 will be described below with reference to FIG. 5.

As previously mentioned, eagerly deoptimizing an optimized frame through the use of a vframe array allows the deletion of a compiled method associated with the optimized frame to occur at substantially any time during the execution of a program. By not delaying deoptimization of a frame until the frame has control, computer resources may be freed through deoptimization more efficiently. For example, when space is needed within a computer system, a compiled method may be slated for deletion. Allowing the associated frame to be deoptimized even while the frame is in the middle of a stack enables the compiled method to be substantially immediately deleted, thereby quickly freeing space within the computer system when space is needed.

Figure 4:
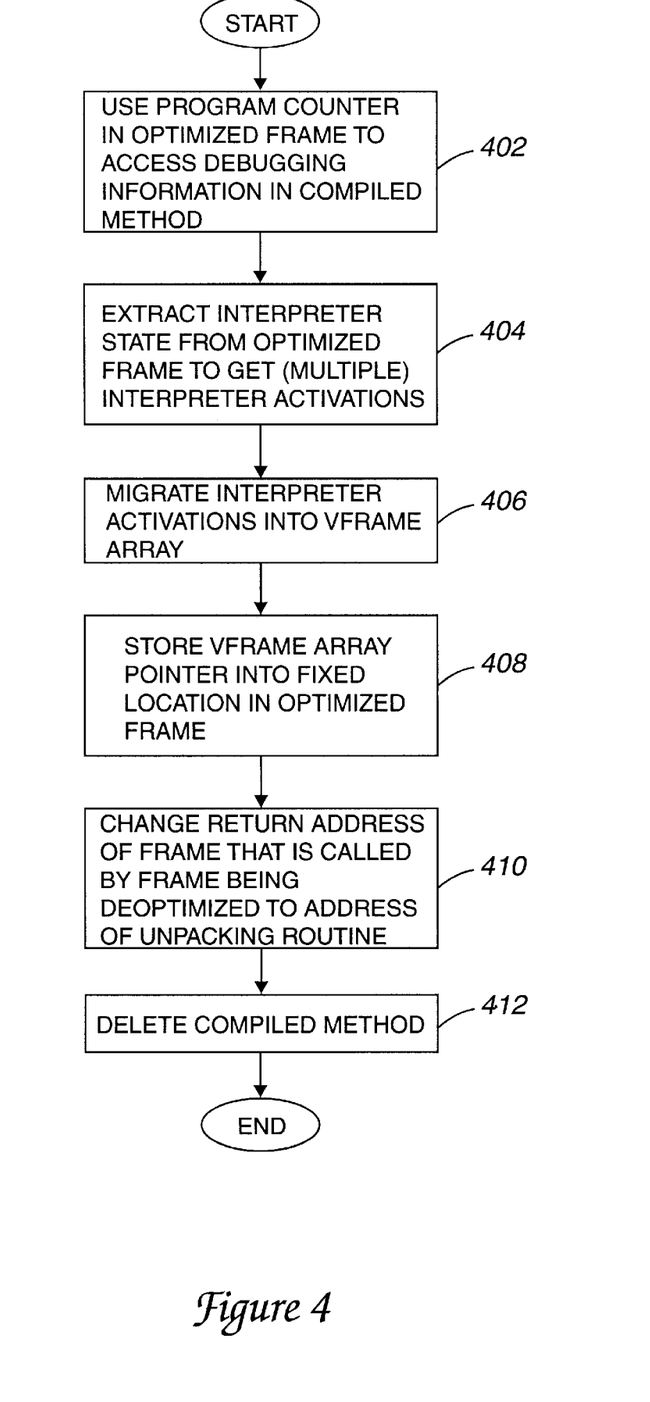
FIG. 4 is a process flow diagram which illustrates the steps associated with eagerly deoptimizing a compiled frame in accordance with an embodiment of the present invention.

Referring next to FIG. 4, the steps associated with eagerly deoptimizing an optimized frame will be described in accordance with an embodiment of the present invention. In general, a frame which is optimized to a given level may be deoptimized to a less optimized level for any number of different reasons. While the reasons may be widely varied, such reasons may include, but are not limited to, the need to validate an invalid frame, the need to save space in computer memory, and the need to obtain a machine-independent control stack.

The process of deoptimizing an optimized frame begins at step 402 in which the program counter associated with the optimized frame, or the frame which is to be deoptimized, is obtained. The program counter is obtained for use in accessing access information that is present in the compiled method which is associated with the optimized frame. Access information generally includes, but is not limited to, values or locations of source-level variables associated with the compiled method, as will be appreciated by those skilled in the art.

The access information is used in step 404 to extract an interpreter state from the optimized frame for use in obtaining an interpreter activation. It should be appreciated that there may be multiple interpreter activations which are associated with the optimized frame. Once interpreter activations associated with the optimized frame are obtained, the interpreter activations are migrated, e.g., placed, into a vframe array in step 406. As a result, substantially all information contained within a vframe array, both static and dynamic, may be used to eventually push a series of interpreter frames onto the stack, as will be discussed below with reference to FIG. 5.

After interpreter activations are stored into the vframe array, a pointer to the vframe array is stored within the corresponding, e.g., optimized, frame in step 408. In general, the vframe array pointer may be stored in any fixed location within the optimized frame. By way of example, the vframe array pointer may be stored in the first local variable of the optimized frame, thereby enabling the vframe array pointer to be readily accessed. From step 408, process flow moves to step 410 where the return address of the frame that is being called by the frame which is being deoptimized is set to the address of the unpacking routine for the vframe array. The unpacking routine, which generally includes a migrating routine, will be described in more detail below with reference to FIG. 6.

The compiled method from which access information was obtained may be deleted in step 412 after the return address of the frame that is being called, e.g., the "callee," is changed. In general, the return address of the callee, which may originally be set to the address of the compiled method, is changed to prevent the callee from returning to a non-existent, deleted compiled method. As will be appreciated by those skilled in the art, in one embodiment, before the compiled method is allowed to be deleted, a determination may be made to ascertain whether other frames reference the compiled method. If other frames reference the compiled method, then the other frames are typically also deoptimized before the compiled method is deleted. It should be appreciated that although the process of deoptimizing a frame is shown to end after the return address is changed in step 410, the associated compiled method is deleted before the deoptimization process is truly completed. As mentioned above, the deletion of the compiled method does not generally occur until all frames associated with the compiled method have been processed, e.g., using steps 402 to 410.

Figure 5:
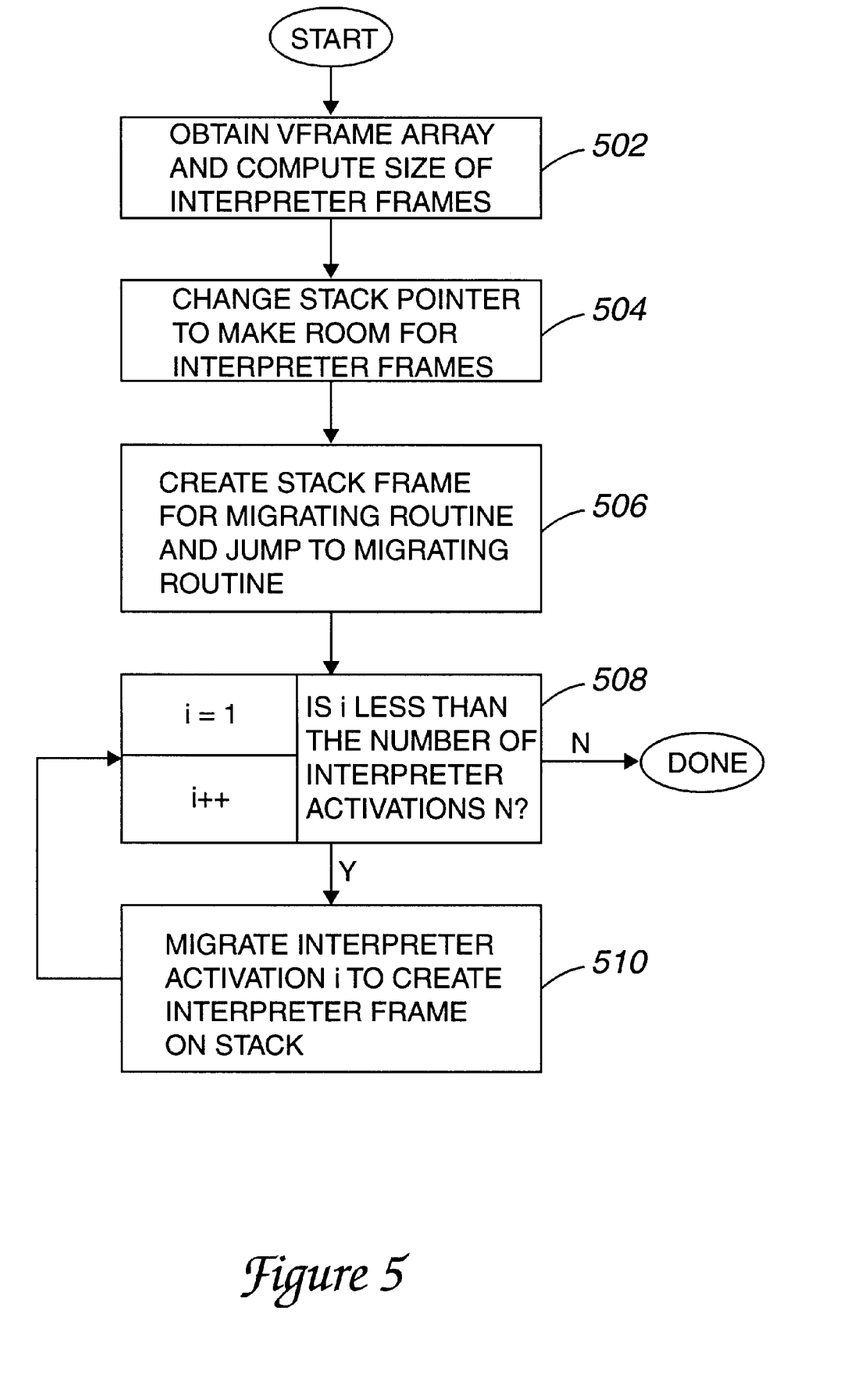
FIG. 5 is a process flow diagram which illustrates the steps associated with unpacking a virtual frame array in accordance with an embodiment of the present invention.

A deoptimized frame, as described above with respect to FIG. 3c, is not physically replaced by the interpreter frames until the deoptimized frame becomes the current frame. In other words, interpreter frames which correspond to the deoptimized frame are not pushed onto the stack in place of the deoptimized frame until the stack pointer references the deoptimized frame. Replacing a deoptimized frame with an interpreter frame generally involves unpacking the vframe array referenced by the interpreter frame to obtain the interpreter frames. FIG. 5 is a process flow diagram which illustrates the steps associated with one method of unpacking a vframe array and placing interpreter frames unpacked from the vframe array onto a stack in accordance with an embodiment of the present invention. The process of replacing a deoptimized frame on a stack with corresponding interpreter frames begins at step 502 in which the vframe array associated with the deoptimized frame is obtained, and the size of corresponding interpreter frames are computed. That is, using the vframe array of the deoptimized frame, the size of the interpreter frames which will replace the deoptimized frame is calculated. Calculating the size of interpreter frames enables space on the stack to be allocated to accommodate the interpreter frames. Each interpreter frame will generally have a size which is dependent upon the size of its corresponding interpreter activation.

In order to allocate space for interpreter frames on the stack, the stack pointer for the stack is modified in step 504. Modifying the stack pointer may include setting the stack pointer to point to a location further up the stack from the deoptimized frame. Typically, the stack pointer is set to identify a location on the stack which will eventually correspond to the location of a highest interpreter frame, associated with the deoptimized frame, within the stack.

After the stack pointer is changed in step 504, a stack frame for a migrating routine is created, and the migrating routine is invoked, in step 506. The migrating routine, as will be appreciated by those skilled in the art, is arranged to place interpreter activations onto the stack. Placing interpreter activations onto a stack typically involves transforming the information from the vframe array into frames. In one embodiment, transforming interpreter activations into interpreter frames includes creating a return address field and a frame pointer field that are associated with each interpreter activation. Invoking the migrating routine may also change the stack pointer further, as for example to identify the stack frame associated with the migrating routine.

Within the migrating routine, interpreter activations are migrated to create interpreter frames on the stack. Specifically, each interpreter activation "i" is migrated to create an interpreter frame on the stack. The number of interpreter frames "N" that are to be created is dependent upon the number of interpreter activations included in the vframe array.

When the migrating routine is invoked, process flow moves from step 506 to steps 508 and 510, which are a representation of a loop in which all interpreter activations in the vframe array are individually migrated to create a corresponding interpreter frame on a stack. In other words, interpreter frames corresponding to interpreter activations are pushed onto the stack. The loop continues until all interpreter activations have been migrated, at which point the process of unpacking a vframe array and placing interpreter frames onto a stack is completed.

Figure 6:
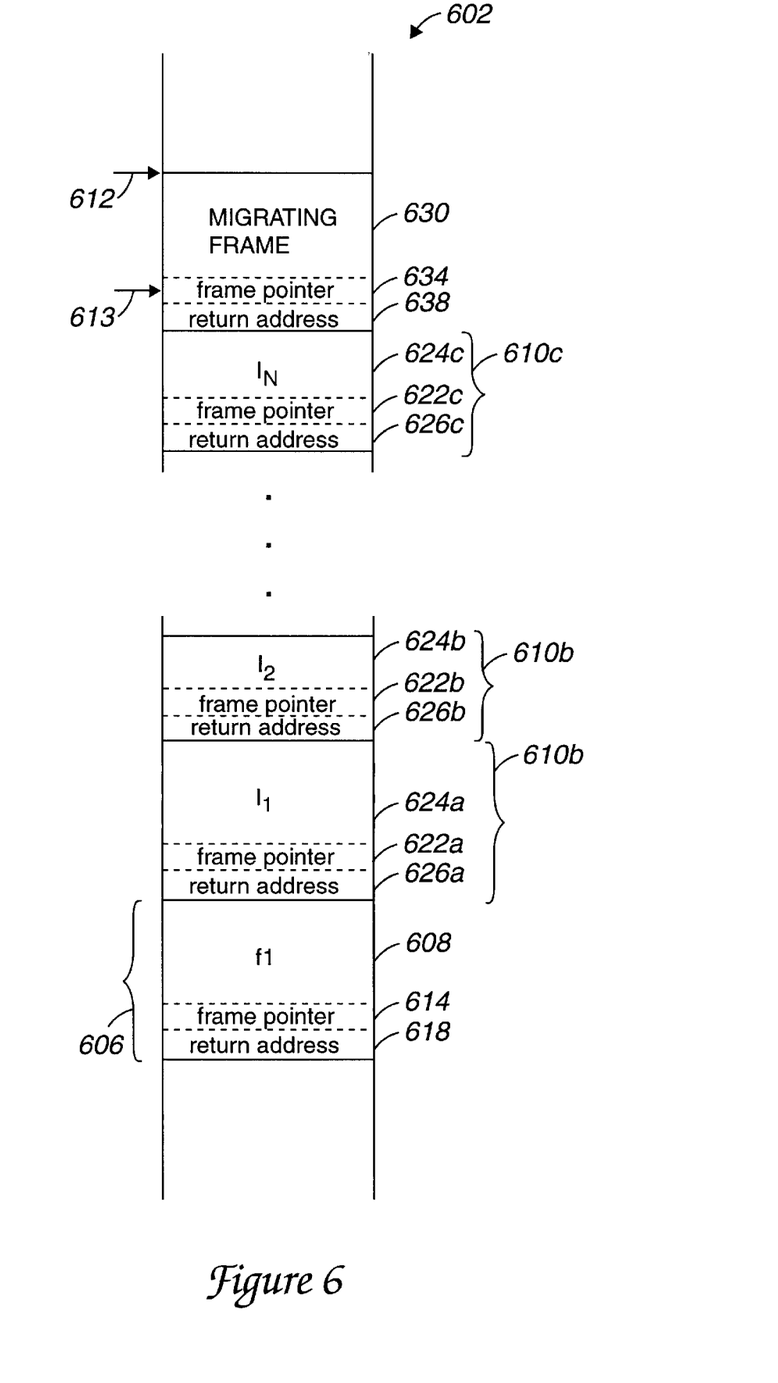
FIG. 6 is a diagrammatic representation of a control stack which includes interpreter frames and a migrating frame in accordance with an embodiment of the present invention.

In general, creating interpreter frames on a stack involves setting various addresses and pointers associated with the interpreter frames. The addresses and pointers which are set, or updated, may vary widely. By way of example, a frame pointer associated with an interpreter frame may be reset to reference another interpreter frame. A return address of an interpreter frame may also be set to properly reference the caller of the interpreter frame. FIG. 6 is a diagrammatic representation of a control stack which includes interpreter frames in accordance with an embodiment of the present invention. In other words, FIG. 6 is a diagrammatic representation of a control stack, after an eager deoptimization process has been completed, and interpreter frames have been pushed onto the stack. Control stack 602 includes a compiled frame 606 which called another compiled frame (not shown) that was replaced by interpreted frames 610 after deoptimization.

A frame, e.g., compiled frame 606, generally includes a "data portion" 608 which contains program data, including local variables and parameters. Compiled frame 606 also includes a frame pointer 614 and a return address 618. Frame pointer 614 identifies the links associated with compiled frame 606. In other words, frame pointer 614 identifies a frame, e.g., interpreter frame 610a, that is referenced by compiled frame 606. Return address 618 specifies the address location of the frame on stack 602 to which compiled frame 606 returns. Return address 618 specifies the address of the frame which called compiled frame 606, i.e., return address 618 specifies the current program counter of the caller of compiled frame 606. As will be appreciated by those skilled in the art, frame pointer 614 and return address 618 represent control information that is at least partially dependent upon the configuration of an associated interpreter and an associated compiler. Frames within stack 602 may also generally include various other pointers.

When interpreter frames 610 are pushed onto stack 602, frame pointers 622 and return addresses 626 of interpreter frames 610 may be set. That is, links associated with interpreter frames 610 may be established. As previously mentioned, frame pointers 622 may be set to identify frames called by interpreter frames 610. By way of example, frame pointer 622a of interpreter frame 610a may be set to identify interpreter frame 610b. Information relating to frame pointers 622 and return addresses 626 is generally dependent upon the particular location of each interpreter frame on stack 602, and may be readily computed based on the functionality of the interpreter. Hence, such information is typically not included in a corresponding vframe array. Information contained in the vframe array is unpacked into data portions 624 of interpreter frames 610.

Topmost interpreter frame 610c is set up as the caller of a migrating frame 630. Migrating frame 630, which includes a frame pointer 634 and a return address 638, is associated with a migrating routine that is arranged to set up interpreter frames 610 on stack 602, as described above. In other words, migrating frame 630 is essentially arranged to allocate frames 610 on stack 602 such that when the migrating routine returns, the control will be within interpreter frames 610. The migrating routine associated with migrating frame 630 also sets frame pointers 622 and return addresses 626 to reference their appropriate callees and callers using methods which are well known to those skilled in the art. Return address 638 is set to the program counter of the caller of migrating frame 630, while frame pointer 634 is set to identify topmost interpreter frame 610c.

As shown, migrating frame 630 is identified by a stack pointer 612 and is, hence, the frame with control in control stack 602. A frame pointer "fp" 613 identifies the location of control information within the frame identified by stack pointer 612, e.g., frame pointer 634 in migrating frame 630.

While vframe arrays are essentially machine independent, as previously mentioned, interpreter frames 610 are not necessarily machine independent. Therefore, the migrating routine associated with migrating frame 630 is essentially used to add machine dependent information to information obtained from a vframe array. Using the migrating routine, deoptimization may be performed without needing a second control stack or thread for the deoptimization process. As will be appreciated by those skilled in the art, the migrating routine may also execute on a different stack, i.e., a second control stack.

Figure 7:
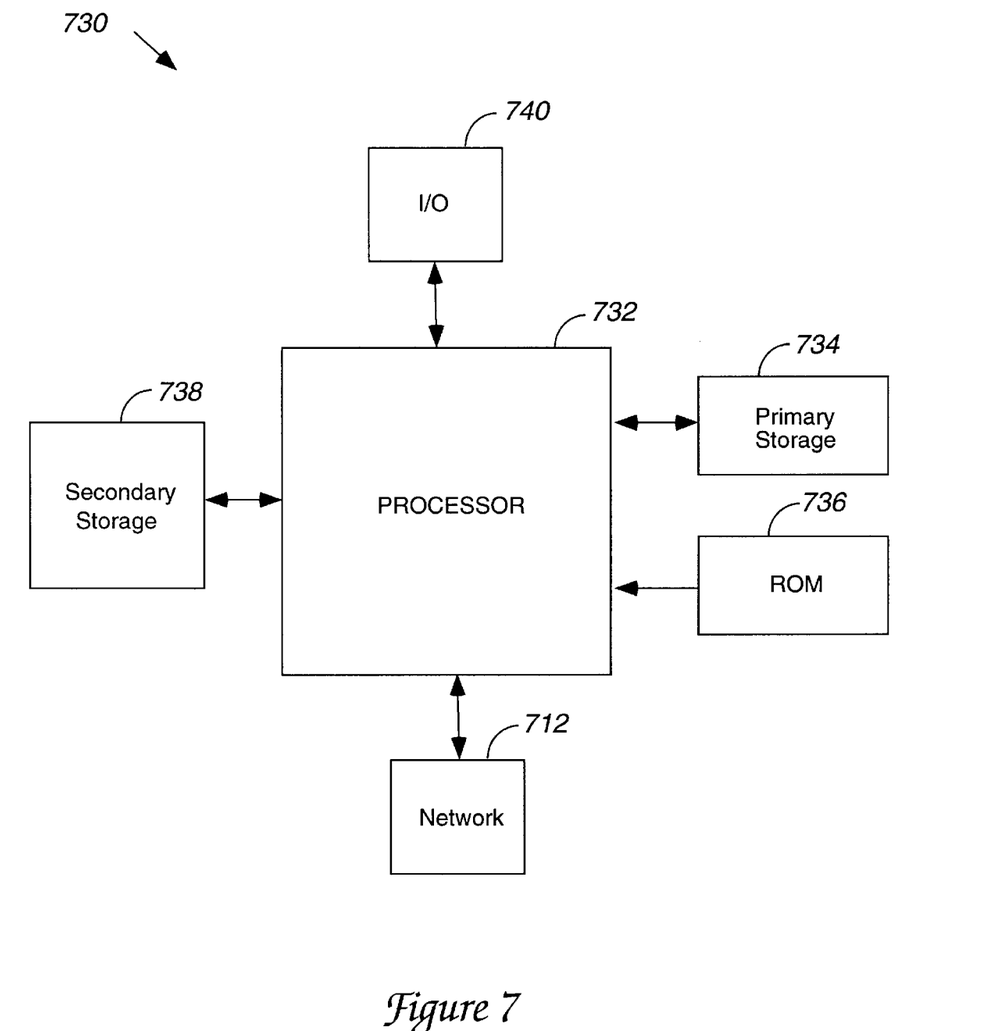
FIG. 7 illustrates a typical, general purpose computer system suitable for implementing the present invention.

The present invention may generally be implemented on any suitable computer system. Specifically, deoptimization as described above may be accomplished using any suitable virtual machine, such as the virtual machine described below with respect to FIG. 8. FIG. 7 illustrates a typical, general purpose computer system suitable for implementing the present invention. The computer system 730 includes any number of processors 732 (also referred to as central processing units, or CPUs) that are coupled to memory devices including primary storage devices 734 (typically a read only memory, or ROM) and primary storage devices 736 (typically a random access memory, or RAM).

Computer system 730 or, more specifically, CPU 732, may be arranged to support a virtual machine, as will be appreciated by those skilled in the art. One example of a virtual machine that is supported on computer system 730 will be described below with reference to FIG. 8. As is well known in the art, ROM acts to transfer data and instructions uni-directionally to the CPU 732, while RAM is used typically to transfer data and instructions in a bi-directional manner. CPU 732 may generally include any number of processors. Both primary storage devices 734, 736 may include any suitable computer-readable media. A secondary storage medium 738, which is typically a mass memory device, is also coupled bi-directionally to CPU 732 and provides additional data storage capacity. The mass memory device 738 is a computer-readable medium that may be used to store programs including computer code, data, and the like. Typically, mass memory device 738 is a storage medium such as a hard disk or a tape which is generally slower than primary storage devices 734, 736. Mass memory storage device 738 may take the form of a magnetic or paper tape reader or some other well-known device. It will be appreciated that the information retained within the mass memory device 738, may, in appropriate cases, be incorporated in standard fashion as part of RAM 736 as virtual memory. A specific primary storage device 734 such as a CD-ROM may also pass data uni-directionally to the CPU 732.

CPU 732 is also coupled to one or more input/output devices 740 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 732 optionally may be coupled to a computer or telecommunications network, e.g., a local area network, an internet network or an intranet network, using a network connection as shown generally at 712. With such a network connection, it is contemplated that the CPU 732 might receive information from the network, or might output information to the network in the course of performing the above-described method steps. Such information, which is often represented as a sequence of instructions to be executed using CPU 732, may be received from and outputted to the network, for example, in the form of a computer data signal embodied in a carrier wave. The above-described devices and materials will be familiar to those of skill in the computer hardware and software arts.

Figure 8:
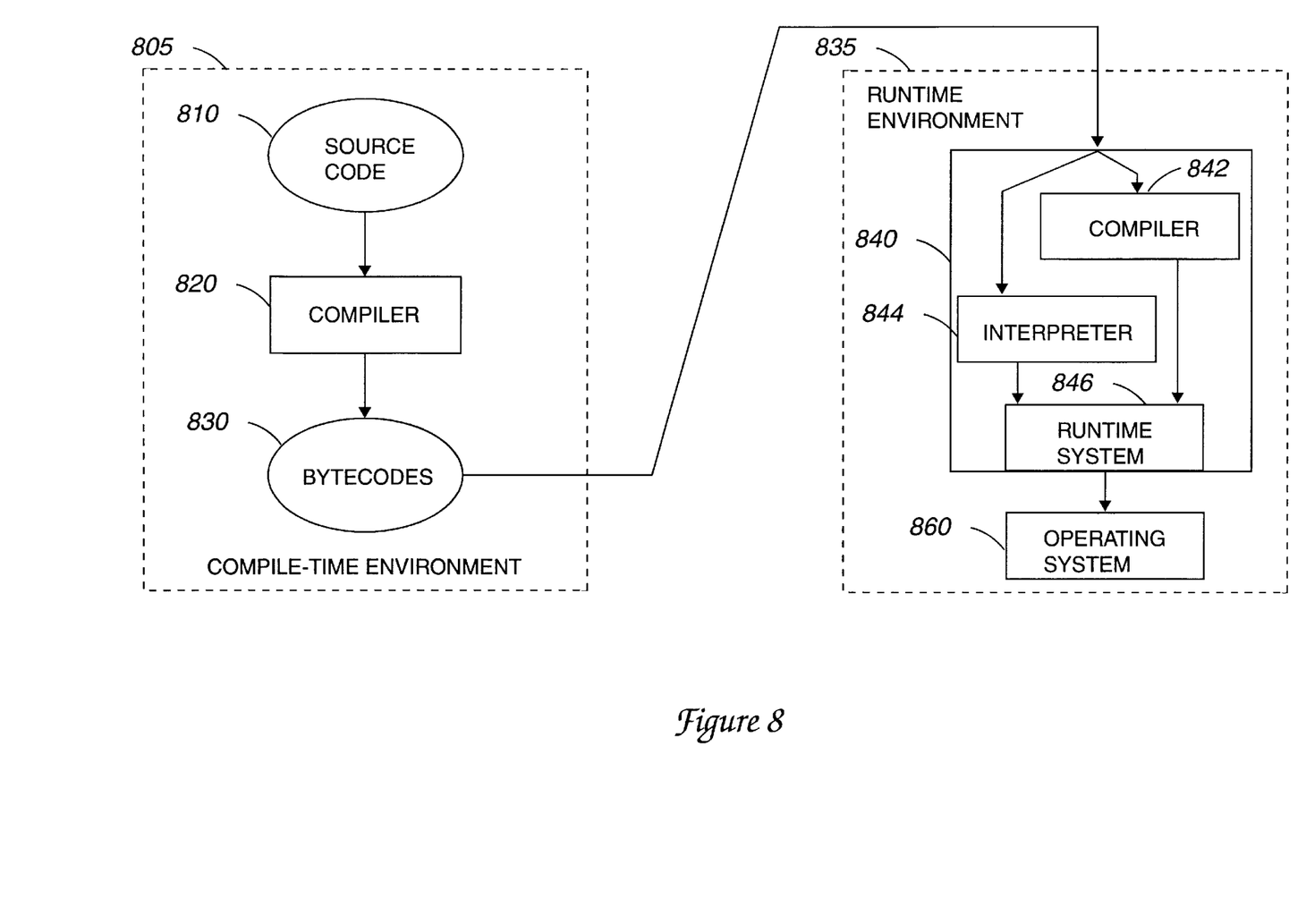
FIG. 8 is a diagrammatic representation of a virtual machine which is suitable for implementing the present invention.

As previously mentioned, a virtual machine may execute on computer system 730. FIG. 8 is a diagrammatic representation of a virtual machine which is supported by computer system 730 of FIG. 7, and is suitable for implementing the present invention. When a computer program, e.g., a computer program written in the Java™ programming language developed by Sun Microsystems of Mountain View, Calif., is executed, source code 810 is provided to a compiler 820 within a compile-time environment 805. Compiler 820 translates source code 810 into byte codes 830. In general, source code 810 is translated into byte codes 830 at the time source code 810 is created by a software developer.

Byte codes 830 may generally be reproduced, downloaded, or otherwise distributed through a network, e.g., network 712 of FIG. 7, or stored on a storage device such as primary storage 734 of FIG. 7. In the described embodiment, byte codes 630 are platform independent. That is, byte codes 830 may be executed on substantially any computer system that is running a suitable virtual machine 840. By way of example, in a Java™ environment, byte codes 830 may be executed on a computer system that is running a Java™ virtual machine.

Byte codes 830 are provided to a runtime environment 835 which includes virtual machine 840. Runtime environment 835 may generally be executed using a processor such as CPU 732 of FIG. 7. Virtual machine 840 includes a compiler 842, an interpreter 844, and a runtime system 846. Byte codes 830 may generally be provided either to compiler 842 or interpreter 844.

When byte codes 830 are provided to compiler 842, methods contained in byte codes 830 are compiled into machine instructions, as described above. On the other hand, when byte codes 830 are provided to interpreter 844, byte codes 830 are read into interpreter 844 one byte code at a time. Interpreter 844 then performs the operation defined by each byte code as each byte code is read into interpreter 844. In general, interpreter 844 processes byte codes 830 and performs operations associated with byte codes 830 substantially continuously.

When a method is called from an operating system 860, if it is determined that the method is to be invoked as an interpreted method, runtime system 846 may obtain the method from interpreter 844. If, on the other hand, it is determined that the method is to be invoked as a compiled method, runtime system 846 activates compiler 842. Compiler 842 then generates machine instructions from byte codes 830, and executes the machine-language instructions. In general, the machine-language instructions are discarded when virtual machine 840 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

Although only a few embodiments of the present invention have been described, it should be understood that the present invention may be embodied in many other specific forms without departing from the spirit or the scope of the invention. By way of example, steps involved with deoptimizing a given frame may be reordered, removed, or added. In general, steps involved with the methods of the present invention may be reordered, removed, or added without departing from the spirit or the scope of the present invention.

Substantially all frames in a stack may be deoptimized, i.e., vframe arrays may be created for substantially all of the frames in a stack. Alternatively, a single vframe array may be created to represent a plurality of frames in a stack. Since vframe arrays are machine independent, deoptimizing an entire stack and, hence, creating vframe arrays for the entire stack, enables the entire stack to be exported to any suitable computer system. In other words, machine independent vframe arrays may be shared between different computer systems. Machine independent vframe arrays may be stored on a medium such as a disk for a later restart of execution. Alternatively, machine independent frames may also be transmitted to another computer, as for example a computer with a different architecture, where execution may continue after the vframe arrays are unpacked into an interpreted control stack, as described above.

In one embodiment, extracting interpreter states from an optimized frame, then placing the interpreter states into a vframe array may involve the use of both static and dynamic interpretations. That is, scope descriptors may be obtained using the program counter associated with the optimized frame, and dynamic information may be obtained substantially directly from the optimized frame. The scope descriptors, which include parameter variables, and the dynamic information, which includes actual values for the parameter variables of the scope descriptors, may then be used to generate vframes. The vframes may then be serialized into a vframe array. The use of scope descriptors is described in "Debugging Optimized Code with Dynamic Deoptimization," by Urs Hölzle, Craig Chambers, and David Ungar (ACM SIGPLAN '92 Conference on Programming Language Design and Implementation, San Francisco, June 1992), which is incorporated herein by reference in its entirety.

While the use of an individual vframe array for each frame which is to be deoptimized has been described, it should be appreciated that a plurality of frames that are to be deoptimized may also share a vframe array. By way of example, when frames which are to be deoptimized are adjacently located on a stack, the interpreter activations associated with each of the adjacent frames may be migrated to a shared vframe array without departing from the spirit or the scope of the present invention.

Although the deoptimization of optimized frames has been described in terms of deoptimizing a compiled frame into an interpreted representation of the compiled frame, in one embodiment, the deoptimization of optimized frames may instead be applied to the deoptimization of frames compiled with a certain level of optimization into frames compiled with a lower level of optimization. In other words, a method compiled with a high level of optimization may be "uncompiled" to reflect a lower level of optimization. Methods compiled to different levels of optimization are generally described in co-pending U.S. patent application Ser. No. 08/944,334 (Atty. Docket No.: SUN1P168/P2840), entitled "Method and Apparatus for Dynamically Optimizing Byte-Coded Programs," which is incorporated herein by reference in its entirety. Reducing the level of optimization for an originally compiled method typically releases memory space associated with the compiled method. When the level of optimization associated with a compilation is reduced, a vframe array may include less-optimized compiled activations of an originally compiled method. Therefore, the present examples are to be considered as illustrative and not restrictive, and the invention is not to be limited to the details given herein, but may be modified within the scope of the appended claims along with their full scope of equivalents.

What is claimed is:

1. A computer-implemented method for deoptimizing a compiled method, the method being in a first state of optimization, the method further being associated with a frame located on a control stack, the computer-implemented method comprising:

creating a data structure, the data structure being separate from the control stack, wherein the data structure includes information related to the method, the information being obtained from the method and from the frame;

creating a reference indicator, the reference indicator being associated with the frame, wherein the reference indicator is arranged to reference the data structure; and deoptimizing the method to a second state of optimization after the data structure is created.

2. A computer-implemented method as recited in claim 1 wherein the data structure is machine independent, and deoptimizing the method includes deleting the method in the first state of optimization.

3. A computer-implemented method as recited in claim 2 wherein the second state of optimization is an interpreted state.

4. A computer-implemented method as recited in claim 1 wherein the frame is located in a middle section of the control stack.

5. A computer-implemented method as recited in claim 1 wherein decompiling the method includes deoptimizing an optimized activation included in the method.

6. A computer-implemented method as recited in claim 5 further including storing the deoptimized activation in the data structure.

7. A computer-implemented method as recited in claim 6 further including:

creating a new frame using the deoptimized activation stored in the data structure; and pushing the new frame onto the control stack in place of the frame.

8. A computer-implemented method as recited in claim 6 wherein the data structure is machine independent, the computer-implemented method further including transferring the data structure between a first computer system and a second computer system.

9. A computer-implemented method as recited in claim 8 wherein the data structure is created on the first computer system, the computer-implemented method further including creating a new frame on the second computer system using the deoptimized activation stored in the data structure.

10. A computer-implemented method for dynamically deoptimizing a first frame on a control stack, the first frame having an associated compiled method, the compiled method including a compiled activation, the computer-implemented method comprising:

deoptimizing the compiled method associated with the first frame, the first frame being located beneath a second frame on the control stack, wherein deoptimizing the compiled method includes deoptimizing the compiled activation, deoptimizing the compiled method further including creating an interpreter equivalent of the compiled activation;

removing the second frame from the control stack;

creating at least one interpreter frame from the interpreter equivalent of the compiled activation; and pushing the at least one interpreter frame onto the stack in place of the first frame.

11. A computer-implemented method as recited in claim 10 further including storing the interpreter equivalent of the compiled activation in a data structure, wherein the data structure is associated with the first frame.

12. A computer-implemented method as recited in claim 11 further including deleting the data structure after the at least one interpreter frame is created.

13. A computer-implemented method for dynamically deoptimizing a compiled method, the compiled method being associated with a first frame selected from a plurality of frames on a control stack, the control stack including a stack pointer arranged to identify a current frame on the control stack, the computer-implemented method comprising:

creating a data structure, the data structure being separate from the control stack, the data structure including interpreter information relating to the first frame and method information relating to the compiled method, wherein the first frame includes a reference to the data structure;

deleting the compiled method;

unpacking the interpreter information included in the data structure when the stack pointer identifies the first frame as the current frame on the control stack, wherein unpacking the interpreter information creates at least one interpreter frame;

pushing the at least one interpreter frame onto the control stack, wherein the first frame is replaced by the at least one interpreter frame.

14. A computer-implemented method as recited in claim 13 further including:

accessing access information associated with the compiled method; and placing the interpreter information into the data structure, wherein placing the interpreter information into the data structure includes accessing the interpreter information using the access information.

15. A computer-implemented method as recited in claim 14 wherein placing the interpreter information into the data structure includes:

extracting the method information from the compiled method;

extracting the interpreter information from the first frame;

creating at least one interpreted activation using the interpreter information and the method information; and migrating the at least one interpreted activation into the data structure.

16. A computer-implemented method as recited in claim 13 wherein the compiled method is deleted before the interpreter information is unpacked.

17. A computer-implemented method as recited in claim 13 further including creating a migrating frame on the stack, wherein the migrating frame is arranged to associate the at least one interpreter frame with a second frame selected from the plurality of frames on the control stack.

18. A computer system for deoptimizing a method, the method being in a first state of optimization, the method further being associated with a frame located on a control stack, the computer system comprising:

a data structure, the data structure being separate from the control stack, wherein the data structure includes information related to the method;

a reference indicator, the reference indicator being associated with the frame, wherein the reference indicator is arranged to reference the data structure; and a deoptimizer arranged to deoptimize the frame to a second state of optimization, wherein the second state of optimization is less optimized than the first state of optimization, the deoptimizer further being arranged to deoptimize the method to a second state of optimization.

19. A computer system as recited in claim 18 wherein the data structure is machine independent, and the deoptimizer is further arranged to delete the method in the first state of optimization.

20. A computer system as recited in claim 19 wherein the second state of optimization is an interpreted state.

21. A computer system as recited in claim 18 wherein the frame is located in a middle section of the control stack.

22. A computer-implemented method as recited in claim 18 wherein deoptimizing the compiled method includes deoptimizing a compiled activation included in the compiled method.

23. A computer-readable medium including computer program code devices arranged to deoptimizing a compiled method, the compiled method being in a first state of optimization, the compiled method further being associated with a frame located on a control stack, the computer-readable medium comprising:

computer program code devices that create a data structure, the data structure being separate from the control stack, wherein the data structure includes information related to the method;

computer program code devices that create a reference indicator, the reference indicator being associated with the frame, wherein the reference indicator is arranged to reference the data structure; and computer program code devices that deoptimize the method to a second state of optimization.

24. A computer-readable medium as recited in claim 23 wherein computer program code devices that create the data structure include computer program code devices that create the data structure such that the data structure is machine independent, and computer program code devices that deoptimize the method include computer program code devices that delete the method in the first state of optimization.

25. A computer-readable medium as recited in claim 24 wherein the computer program code devices that deoptimize the method to the second state of optimization include computer program code devices that deoptimize the method to an interpreted state.

* * * * *